(12) United States Patent
Ermler et al.

(10) Patent No.: US 11,378,941 B2
(45) Date of Patent: Jul. 5, 2022

(54) CONFIGURATION TOOL AND METHOD FOR SCHEDULING AT LEAST ONE CONTROL APPLICATION ON AN INDUSTRIAL CONTROLLER

(71) Applicant: Siemens Aktiengesellschaft, Munich (DE)

(72) Inventors: Rene Ermler, Erlangen (DE); Jörg Neidig, Nuremberg (DE); Martin Witte, Schwabach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 8 days.

(21) Appl. No.: 17/032,350

(22) Filed: Sep. 25, 2020

(65) Prior Publication Data
US 2021/0096550 A1    Apr. 1, 2021

(30) Foreign Application Priority Data
Sep. 27, 2019    (EP) .................................... 19200064

(51) Int. Cl.
*G05B 19/418* (2006.01)

(52) U.S. Cl.
CPC ... *G05B 19/41865* (2013.01); *G05B 19/4183* (2013.01); *G05B 19/41845* (2013.01)

(58) Field of Classification Search
CPC .......... G05B 19/41865; G05B 19/4183; G05B 19/41845; G05B 19/056; G05B 19/0426; G05B 19/41835; G05B 19/41855; G05B 19/4188
See application file for complete search history.

(56) References Cited

U.S. PATENT DOCUMENTS

2008/0249641 A1    10/2008  Enver et al.
2012/0290144 A1*  11/2012  Yuasa ................... G06Q 10/00
                                              700/295

OTHER PUBLICATIONS

S. Mubeen, M. Becker, X. Zhao, L. Gan, M. Behnam and T. Nolte, "Towards automated deployment of IEC 61131-3 applications on multi-core systems," 2016 IEEE World Conference on Factory Communication Systems (WFCS), 2016, pp. 1-4, doi: 10.1109/WFCS.2016.7496531. (Year: 2016).*

(Continued)

*Primary Examiner* — Christopher E. Everett
(74) *Attorney, Agent, or Firm* — Cozen O'Connor

(57) ABSTRACT

A method for scheduling cyclic control applications on a controller includes defining a plurality of function block clusters by clustering a plurality of function blocks of the cyclic control applications based on a sampling time of each function block, creating a plurality of organization blocks from the plurality of function block clusters, each organization block comprising at least one function block from a function block cluster and an organization block record including a sampling time value and next deadline time value associated with the corresponding organization block, and scheduling the plurality of organization blocks for execution on the controller, based on either a sampling time value and/or the next deadline time value, where a sampling time value of an organization block is based at least one sampling time of at least one function block of the corresponding organization block.

11 Claims, 5 Drawing Sheets

(56) References Cited

OTHER PUBLICATIONS

A. Monot, A. Vulgarakis and M. Behnam, "PASA: Framework for partitioning and scheduling automation applications on multicore controllers," Proceedings of the 2014 IEEE Emerging Technology and Factory Automation (ETFA), 2014, pp. 1-8, doi: 10.1109/ETFA.2014.7005153. (Year: 2014).*

Lobov Andrei et al: "An Algorithm for Siemens STL representation in TNCES", Emerging Technologies and Factory Automation, 2006. ETFA '06. IEEE Conference On, IEEE, PI, pp. 641-647.

EP Search Report dated Mar. 20, 2020 based on EP19200064 filed Sep. 27, 2019.

* cited by examiner

FIG 4

| Current Time | OB 1 (sampling time/previous invocation time/estimated execution time/next deadline time in MS) | OB 2 |
|---|---|---|
| 1 | 80/0/0/0 | 150/0/0/0 |
| 2 | 80/1/0/0 | 150/0/0/0 |
| 52 | 80/1/50/81 | 150/0/0/0 |
| 53 | 80/1/50/81 | 150/52/0/0 |
| 63 | 80/1/50/81 | 150/52/11/202 |
| 64 | 80/63/50/81 | 150/52/11/202 |
| 115 | 80/63/52/143 | 150/52/11/202 |
| 116 | 80/115/52/143 | 150/52/11/202 |
| 167 | 80/115/52/195 | 150/52/11/202 |
| 168 | 80/167/52/195 | 150/52/11/202 |
| 217 | 80/167/52/245 | 150/52/11/202 |
| 218 | | 150/217/11/202 |

CONFIGURATION TOOL AND METHOD FOR SCHEDULING AT LEAST ONE CONTROL APPLICATION ON AN INDUSTRIAL CONTROLLER

BACKGROUND OF THE INVENTION

Field of the Invention

The present invention relates to controllers in industrial automation systems and, more particularly, to scheduling control applications on the controllers of an industrial automation system.

Description of the Related Art

Controllers are commonly used in process industries and factories for control of various industrial processes. As a part of process control, a controller is used to monitor signals from sensors in a process and then control actuators associated with the process. In this regard, one or more control applications are installed on the controller for controlling the industrial processes.

Control applications are implemented in controllers as a plurality of function blocks (also referred to as functions or FBs). A controller provides a set of tasks with predefined real-time properties and execution semantics (referred to as organization blocks or OBs). Function blocks are allotted to organization blocks for execution on the controller. These organization blocks are then executed by operating system of the controller in accordance with their execution semantics (cyclic, or interrupt driven). Conventionally, the scheduling of control applications on controllers is statically defined at the engineering phase of the industrial automation system and includes some human intervention. Function blocks are assigned at engineering to a suitable programmable logic controller (PLC) task (i.e., organization block) manually. The organization blocks are then configured or equipped with suitable parameters such as frequency or priority.

Most control applications are cyclic in nature, i.e., when the execution of a control application is complete, the operating system of the controller restarts the control application. Accordingly, function blocks of such cyclic control applications are allotted in one or more cyclic organization blocks. These organization blocks have the lowest priority of all organization blocks. Accordingly, execution of cyclic organization blocks can be interrupted by any other organization blocks or by events of any other event class. In case several cyclic organization blocks have been created, these are called strictly one after the other in the order of their organization blocks numbers and each cyclic OB contributes to the cycle time of the control application. If the cycle time exceeds the "maximum cycle time", then an appropriate action can be defined, which is typically the termination of execution of the application on the PLC.

However, the sequential execution of organization blocks quickly reaches its practical limits when in large projects during which very large number of functions with different timing demands must be crammed into a controller. Violations of the real-time constraints, such as cycle overrun, lead to alarms in the PLC that need be handled separately or lead to a halt of the PLC if unhandled.

In order to address this issue, conventional PLCs have a priority-based preemptive scheduler. High priority, typically cyclic tasks, are triggered by a timer interrupt and lead to preemption of lower priority tasks. The priorities are statically assigned in the engineering system for the PLC. However, this leads to low priority tasks or organization blocks being improperly scheduled and accordingly not being able to meet deadlines.

Therefore, a flexible scheduling method is needed that allows the PLC operating system to react based on changing real-time requirements and load patterns and reduce jitter.

U.S. Pub. No. 2008/0249641 discloses a control module for grouping fieldbus segments in accordance with the execution location (i.e., in a controller or in a I/O) of the corresponding fieldbus segment. Based on the grouping, the execution of the fieldbus segments are scheduled. However, this does not address the above-raised technical issues.

SUMMARY OF THE INVENTION

In view of the foregoing, it is therefore and object of the invention to provide a method for scheduling one or more cyclic control applications on a controller, where each cyclic control application comprises one or more function blocks.

This and other objects and advantages are achieved in accordance with the invention by a method comprising defining a plurality of function block clusters by clustering a plurality of function blocks of the cyclic control applications based on a sampling time of each function block from the plurality of function blocks, creating a plurality of organization blocks from the plurality of function block clusters, and scheduling the plurality of organization blocks for execution on the controller, based on at least one of a sampling time value and the next deadline time value of each organization block from the plurality of organization block.

Each function block cluster comprises one or more function blocks having a sampling time with a corresponding range. Each organization block comprises one or more function blocks from a function block cluster and an organization block record including the sampling time value and the next deadline time value associated with the corresponding organization block. The sampling time value of an organization block is determined based on one or more sampling times of one or more function blocks of the corresponding organization block. The next deadline time value of an organization block is determined based on one or more deadline time values of one or more function blocks of the corresponding organization block.

In an exemplary embodiment, each organization block record further comprises one or more of an invocation time value, and an estimated execution time value associated with the corresponding organization block. In an embodiment, scheduling the plurality of organization blocks comprises determining a first organization block, where the next deadline time value of the first organization block is prior to the next deadline time value of each other organization block, and scheduling the first organization block in a first position for execution on the controller. In an exemplary embodiment, a plurality of function block clusters is defined by applying a K-means clustering technique on the plurality of function blocks. This enables automatic clustering of function blocks to create organization blocks.

In an embodiment, the method further comprises determining a functional relationship between a first function block and second function block from the plurality of function blocks, where the execution of the second function block is dependent on the execution of the first function block, and also comprises defining a logical function block, where the logical function block comprises the first function block and the second function block, and where the logical function block is for scheduling the execution of the first and second function blocks. The sampling time of the logical function block is determined based on a sampling time of the first function block and a sampling time of the second function block. By creating logical blocks, a sequence of execution between interconnected function blocks is retained.

In another embodiment, the method further comprises updating the invocation time value and the next deadline value time of an organization block from the plurality of organization blocks after the execution of the corresponding organization block.

It is also an object of the invention to provide a configuration tool for scheduling one or more cyclic control applications on a controller. Each cyclic control application comprises one or more function blocks. The configuration tool comprises a network interface connected to the controller and a data repository comprising a plurality of function blocks, and one or more processors connected to a memory module storing one or more instructions. The one or more processors, upon execution of the one or more instructions, are configured to receive a plurality of function blocks associated with the controller from the data repository via the network interface, define a plurality of function block clusters by clustering a plurality of function blocks of the cyclic control applications based on a sampling time of each function block from the plurality of function blocks, create a plurality of organization blocks from the plurality of function block clusters, where each organization block comprises one or more function blocks from a function block cluster and an organization block record including a sampling time value and the next deadline time value associated with a corresponding organization block, and deploy the plurality of organization blocks for execution on the controller.

In an embodiment, the configuration tool is configured to determine a functional relationship between a first function block and second function block from the plurality of function blocks, where the execution of the second function block is dependent on the execution of the first function block and configured to define a logical function block, where the logical function block comprises the first function block and the second function block, and where the logical function block is for scheduling the execution of the first and second function blocks.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which:

FIG. 4 is an illustration of an exemplary table for dynamic scheduling of organization blocks on a controller in accordance with the invention;

DETAILED DESCRIPTION OF THE EXEMPLARY EMBODIMENTS

The aspects of the invention are further explained in reference to the FIGS. 1-6.

Figure 1:
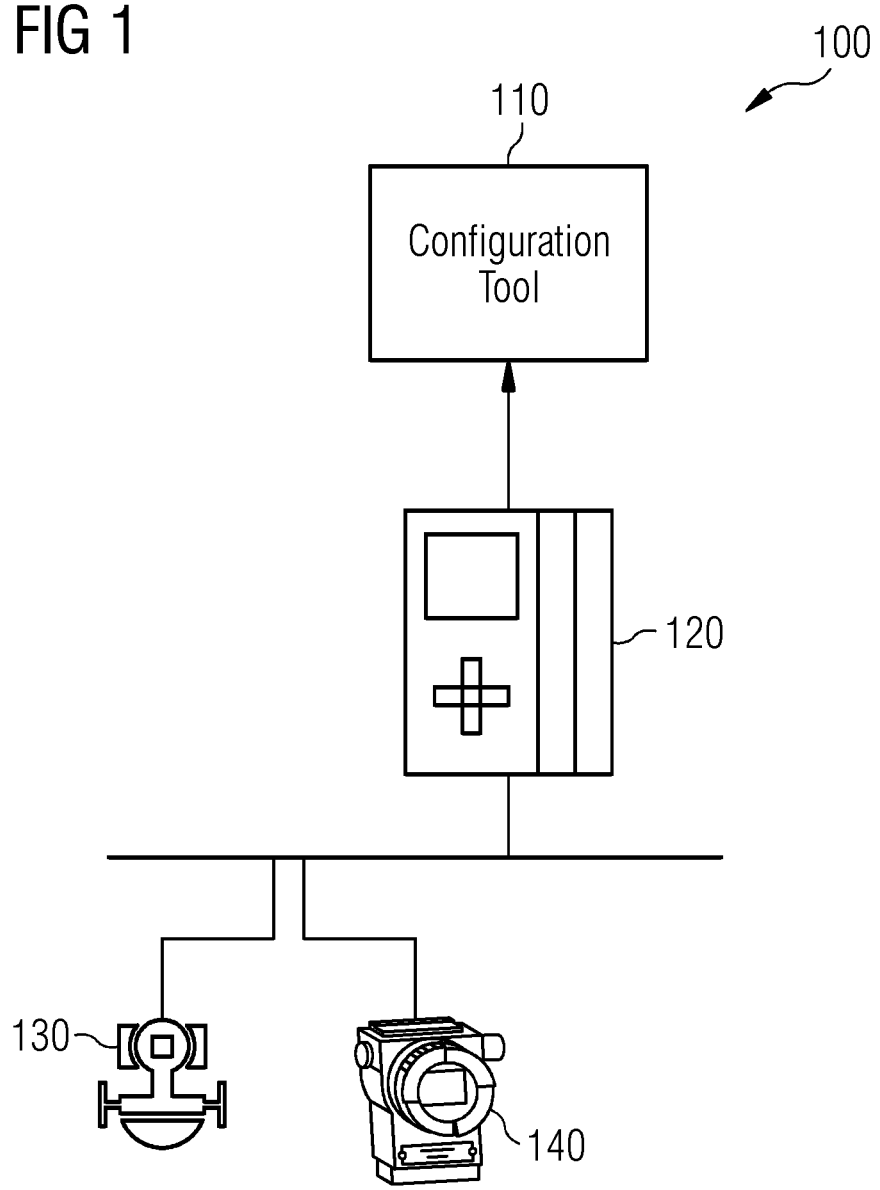
FIG. 1 is a schematic illustration of an exemplary industrial automation system including a controller and a configuration tool for deploying control applications on the controller in accordance with the invention.

FIG. 1 illustrates an industrial automation system 100 in an industrial facility. Industrial facility herein refers to any environment where one or more industrial processes, such as manufacturing, refining, smelting, assembly of equipment, may occur and includes process plants, oil refineries, automobile or factories. The industrial automation system 100 includes a plurality of control devices such as programmable logic controllers (shown in FIG. 1 as controller 120), process controllers, supervisory controllers, or operator devices.

The control devices (for example, controller 120) are connected to a plurality of field devices such as actuators (not shown) and sensor devices (e.g., flowmeter 130 and pressure transmitter 140) for monitoring and controlling industrial processes in the industrial facility. These field devices can include flowmeters, value actuators, temperature sensors, and/or pressure sensors. In order to enable control of the industrial processes in the industrial facility, a plurality of control applications is installed on the controllers. One or more control applications on the controllers are cyclic applications.

Cyclic applications herein refer to applications that repeat their execution continuously, as long as an anomalous condition does not occur. As mentioned previously, the control applications are implemented in controllers via a plurality of function blocks. These function blocks are assigned to organization blocks of the controller which are executed in the controller, as subsequently explained with reference to FIG. 2.

Figure 2:
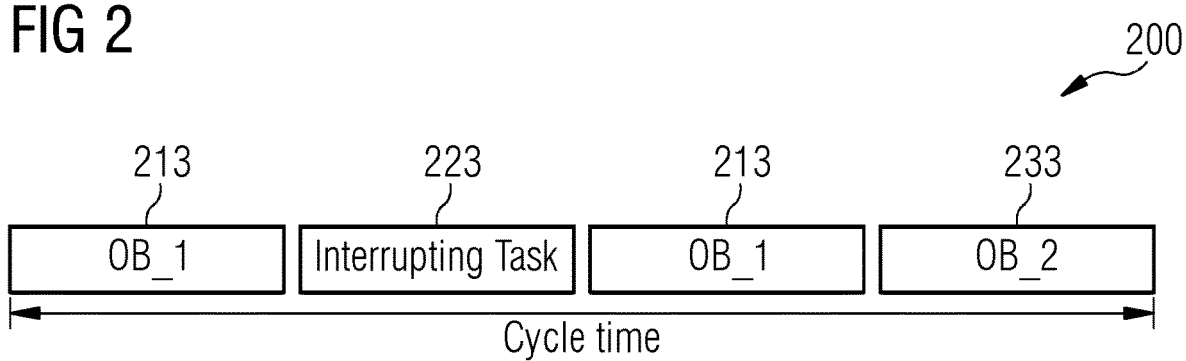
FIG. 2 is a schematic illustration of an exemplary execution sequence of a control application on a controller in accordance with the invention.

FIG. 2 illustrates an exemplary execution sequence on the controller 120. In a first time instance, the execution of the organization block 213 is initiated. At a second time instance, an interrupting task may pause the execution of the organization block 213. At a third time instance, the interrupting task is completed and the execution of the organization block 213 is resumed. At a fourth time instance, the execution of the organization block 213 is completed and the execution of organization block 233 is initiated. The execution of the organization 213 is scheduled to be repeated after the execution of the organization block 233. As seen from the FIG. 2, usually execution of cyclic organization blocks having lower priorities in comparison to other tasks are subject to interruptions. Accordingly, during scheduling of organization blocks, consideration must be made with respect to interruptions and other jitters to ensure deadlines are met. This is performed by the controller 120 and the configuration tool 110. As shown in FIG. 1, configuration tool 110 is connected to the controller 120 for configuring the controller 120 during engineering of the industrial automation system 100. The configuration tool 110 receives the plurality of control applications to be deployed on the controller 110. Each control application comprises one or more function blocks.

The configuration tool 110 generates a plurality of organization blocks from the function blocks of the control applications. The configuration tool 110 then generates a schedule of the organization blocks. The plurality of organization blocks and the initial schedule is sent to the controller 120 for deployment. The controller 120 receives the plurality of the organization blocks and initiates execution of the organization blocks in accordance with the schedule. During execution of the organization blocks, the controller 120 updates the schedule to account for interruptions and execution times of the organization blocks to ensure deadlines constraints are met, as explained subsequently with reference to FIG. 3.

Figure 3:
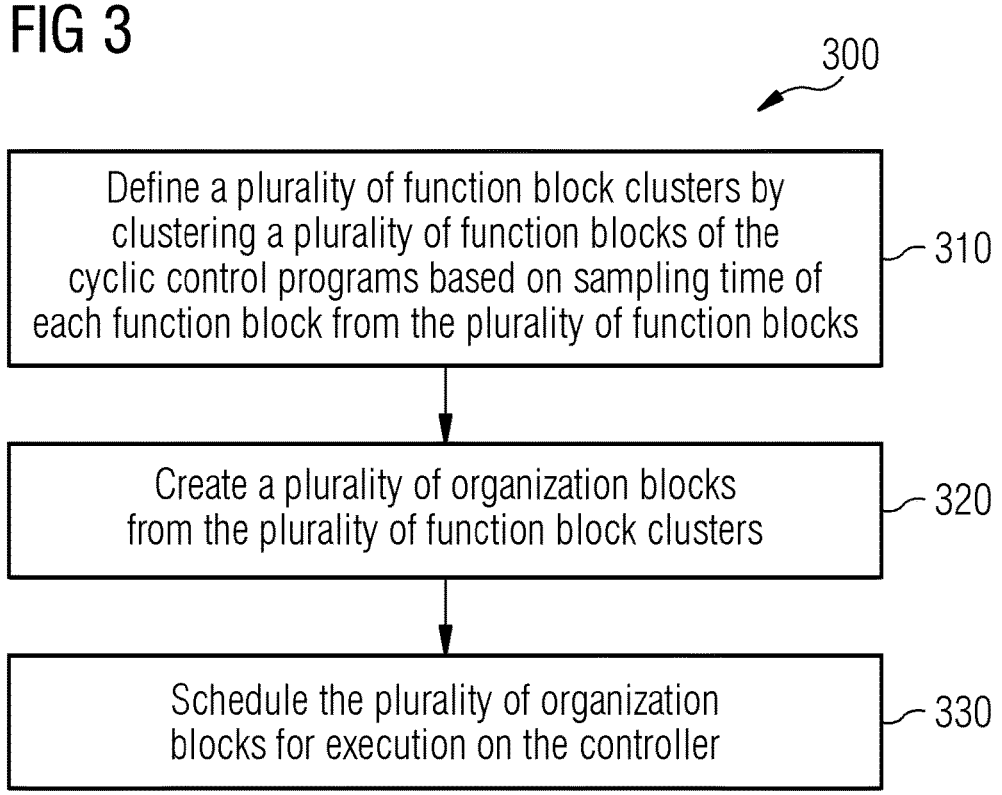
FIG. 3 is a schematic illustration of an exemplary for chart of the method for scheduling one or more control applications on a controller in accordance with the invention.

FIG. 3 illustrates an exemplary method 300 for scheduling one or more cyclic control applications on the controller 120. At step 310, the configuration tool 110 defines a plurality of the function block clusters from the plurality of function blocks of the cyclic control applications. Function block herein refers to one or more processing operations to be performed on one or more input variables for generating one or more output variables. Function blocks may be represented using function block diagrams, structured text, instruction list, and/or ladder logic.

The configuration tool 110 clusters the plurality of function blocks based on the sampling time of the function block such that function blocks have similar sampling times that are within a time range are placed with a cluster. Sampling time herein refers to the time required for execution of the function block. In an embodiment, the sampling time includes a minimum and maximum sampling time value.

In an exemplary embodiment, clustering by the configuration tool 110 is performed based on one or more predefined parameters including sampling time delta, number of organization blocks available in the controller 120, etc.

Sampling time delta refers to the difference between sampling times of two function blocks. In an embodiment, the configuration tool 110 applies a K-means clustering technique for defining the clusters based on a sampling time delta of 30 milliseconds. For example, the plurality of function blocks of the control applications includes six function blocks having sampling time 80 milliseconds, 85 milliseconds, 150 milliseconds, 155 milliseconds, 160 milliseconds and 300 milliseconds. Accordingly, the configuration tool 110 creates three function block clusters: a first function block cluster comprising function blocks having sampling time 80 and 85 ms, a second function block cluster comprising function blocks having sampling time 150, 155, and 160 and a third function block cluster comprising function block having sampling time 300 ms.

In another embodiment, the operating system (OS) of the controller 120 can accommodate four organization blocks of free cycle execution. Accordingly, the configuration tool 110 includes a constraint of maximum four clusters, while generating the clusters. Based on this constraint, the configuration tool 110 may generate four or less clusters from the function blocks.

At step 320, the configuration tool 110 then creates a plurality of organization blocks from the plurality of function block clusters. Organization block herein refers to an execution control element available in the controller to which one or more function blocks may be assigned. Organization block defines the execution entry point and execution semantics of the function blocks assigned to the corresponding organization block. Organization block may also be referred to as task, thread, program, or organizational unit. A plurality of organization types and a number of organization block are predefined in a controller. For example, based on execution semantics, a controller may have free cycle organization blocks, cyclic interrupts organization blocks, and/or time of day interrupts organization blocks.

Each organization block comprises one or more function blocks from at least one function block cluster and an organization block record. Information associated with the execution of the organization block is stored in the organization block record. The organization block record contains metadata regarding the organization block. The metadata includes a priority class, event and class identifiers, sampling time value, an invocation time value associated with the previous invocation, estimated execution time and next deadline time value associated with a corresponding organization block.

Priority class is indicative of a priority of the organization block set by the configuration tool 110 based on the priorities of the function blocks assigned to the corresponding organization block. Event and class identifiers of an organization block are set by the configuration tool 110 to indicate the execution semantics of the organization block. Sampling time of an organization block is based on the sampling time of each function block assigned to the corresponding organization block. In an embodiment, the sampling time of an organization block is calculated by adding the sampling time or minimum sampling of each function block assigned to the corresponding organization block. Previous invocation time is the instant in time at which the organization block was previously invoked by the controller 120 for execution. Estimated execution time value is the maximum time required in an actual execution of the organization block. The next deadline time value is the time by which the organization block has to be executed by the controller 120. At an initial time (i.e., before the start of the first cycle of a first control application on the controller 120), previous invocation time, estimated execution time and next deadline time value of the organization blocks of the first control application are all set to zero.

In an embodiment, each organization block is created from each cluster from the one or more function block clusters. For example, the first organization block is created from the first function block cluster and accordingly the first organization blocks comprises function blocks having sampling time 80 and 85 ms. Similarly, the second organization block is created from the second function block cluster and accordingly the second organization blocks comprises function blocks having sampling time 150, 155, and 160. Similarly, the third organization block is created from a third function block cluster and comprises function block having sampling time 300 ms.

At step 330, the configuration tool 110, in coordination with the controller 120, then schedules the execution of the organization blocks on the controller 120. The configuration tool 110 schedules the execution of the organization block based on the sampling time or the next deadline time value.

In an embodiment, prior to deployment of the organization blocks on the controller 120, the configuration tool 110 schedules the execution of the organization blocks sequentially.

Based on the schedule from the configuration tool 110, the controller 120 executes each of the organization block sequentially in the first cycle. During the execution of the organization block, the controller 120 updates the organization block record for each organization block. Upon completion of the initial or first cycle of execution of the organization blocks, the execution of organization blocks is then scheduled again as the organization blocks are cyclic. Next, either the configuration tool 110 or the controller 120 determines the schedule for execution based on the next deadline value of each organization block as stored in the organization block record. Scheduling herein refers to short term dynamic scheduling, where the controller 120 selects an organization block for execution based on the next deadline time value, as further explained with reference to an exemplary case shown in FIG. 4.

FIG. 4 illustrates an exemplary table 400 for dynamic scheduling of organization blocks OB1 and OB2. The table comprises first column 410 indicates time instances related to execution of the organization blocks. The second column 420 indicates the organization block record of the organization block OB1. The third column 430 indicates the organization block record of the organization block OB2. The organization block record is in the format 'sampling time/previous invocation time/estimated execution time/ next deadline time'.

The initial execution (i.e., the first cycle) of the OB1 and OB2 is performed sequentially. Accordingly, at time 1 ms, the controller 120 begins the execution of the OB1 (having organization block record 80 ms sampling time/0 ms invocation time/0 ms estimated execution time/0 ms next deadline time). Accordingly, the controller 120 updates the previous invocation time of the organization block record of OB1 to reflect the invocation time 1 ms by updating organization block record to 80/1/0/0. At time instance 52 ms, the execution of organization block OB1 is then completed. At this time, the controller 120 updates the organization block record of OB1 by updating the estimated execution time and the next deadline time value. The controller 120 calculates the estimated execution time value by determining the time from invocation time to completion of execution time. In the current case, the estimated execution time is 51 ms, i.e., 52 ms (completion of execution)−1 ms (previous invocation time). The controller 120 then determines the next deadline time value based on the current execution completion time, sampling time and estimated execution time. In the current case, the next deadline time value is 81 ms i.e., 80 ms (sampling time)+51 ms (current execution completion time)−50 ms (estimated execution time).

The controller 120 then starts the execution of OB2. Accordingly, the controller 120 updates the previous invocation time of the organization block record of OB2 to reflect the invocation time 52 ms by updating organization block record to 80/52/0/0. At time instance 63 ms, the execution of organization block OB2 is then completed. At this time, the controller 120 updates the organization block record of OB2 by updating the estimated execution time and the next deadline time value. The controller 120 calculates the estimated execution time value by determining the time from invocation time to completion of execution time. Here, the estimated execution time is 11 ms, i.e., 63 ms (completion of execution)−52 ms (previous invocation time). The controller 120 then determines the next deadline time value based on the current execution completion time, sampling time and estimated execution time. Here, the next deadline time value is 202 ms, i.e., 150 ms (sampling time)+63 ms (current execution completion time)−11 ms (estimated execution time).

One cycle of the control application is now complete. As a result, the execution is again restarted. For selecting or scheduling the organization block to be executed, the controller 120 determines the organization block having the earliest deadline among all the organization blocks. This is also known as earliest deadline first scheduling. Earliest deadline first herein refers to scheduling execution of an organization block that has the next deadline time value prior to every other next deadline time value of the all the other organization blocks. Here, amongst OB1 (having next deadline time at 81 ms) and OB2 (having next deadline time at 202 ms), the controller 120 selects OB1 for execution. The controller 120 then starts the execution of OB1. Accordingly, the controller 120 updates the previous invocation time of the organization block record of OB1 to reflect the invocation time 63 ms by updating organization block record to 80/63/50/81. At time instance 115 ms, the execution of organization block OB1 is then completed. At this time, the controller 120 updates the organization block record of OB1 by updating the estimated execution time and the next deadline time value. The controller 120 calculates the estimated execution time value by determining the time from invocation time to completion of execution time. In the current case, the estimated execution time is 52 ms i.e. 115 ms (completion of execution)−63 ms (previous invocation time). The controller 120 then determines the next deadline time value based on the current execution completion time, sampling time and estimated execution time. Here, the next deadline time value is 143 ms, i.e., 80 ms (sampling time)+115 ms (current execution completion time)−52 ms (estimated execution time).

The controller 120 then again selects an organization block having the earliest deadline first. Here, amongst OB1 (having next deadline time at 143 ms) and OB2 (having next deadline time at 202 ms), the controller 120 selects OB1 for execution. The controller 120 then starts the execution of OB1. Accordingly, the controller 120 updates the previous invocation time of the organization block record of OB1 to reflect the invocation time 115 ms by updating organization block record to 80/115/50/81. At time instance 167 ms, the execution of organization block OB1 is then completed. At this time, the controller 120 updates the organization block record of OB1 by updating the estimated execution time and the next deadline time value. The controller 120 calculates the estimated execution time value by determining the time from invocation time to completion of execution time. Here, the estimated execution time is 52 ms, i.e., 167 ms (completion of execution)−115 ms (previous invocation time). The controller 120 then determines the next deadline time value on the basis of the current execution completion time, sampling time and estimated execution time. In the current case, the next deadline time value is 195 ms, i.e., 80 ms (sampling time)+167 ms (current execution completion time)−52 ms (estimated execution time).

The controller 120 then again selects an organization block having the earliest deadline first. Here, amongst OB1 (having next deadline time at 195 ms) and OB2 (having next deadline time at 202 ms), the controller 120 selects OB1 for execution. The execution of OB1 is completed at 245 ms. The controller 120 then again selects an organization block having the earliest deadline first. Here, amongst OB1 (having next deadline time at 245 ms) and OB2 (having next deadline time at 202 ms), the controller 120 selects OB2 for execution.

Figure 5:
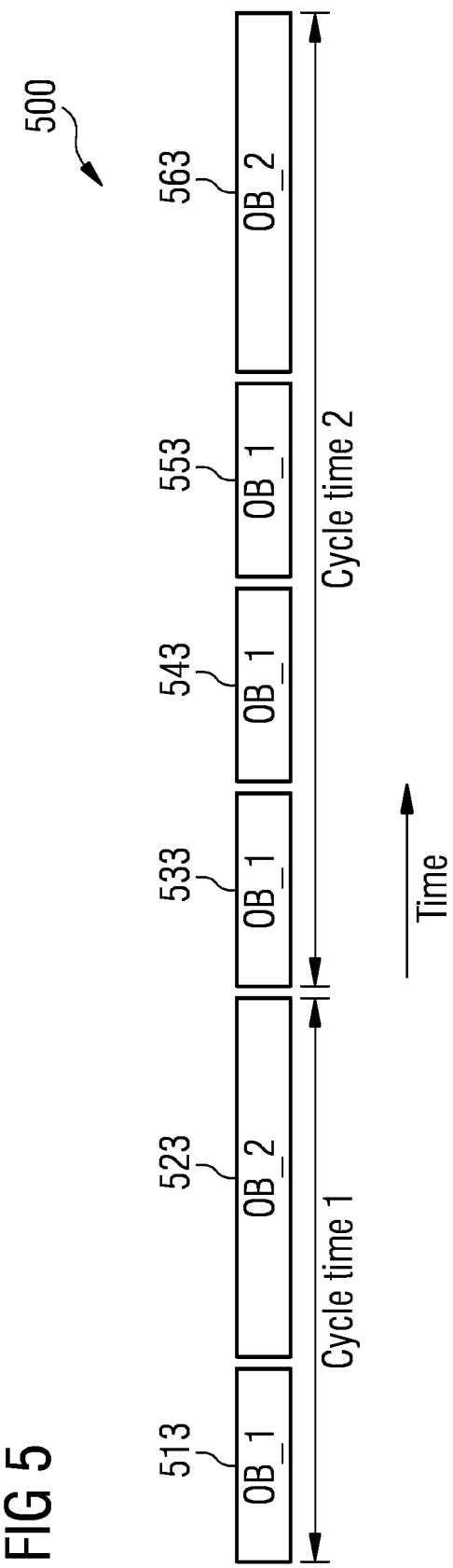
FIG. 5 is a schematic illustration of an example execution sequence of two organization blocks on a controller in accordance with the invention.

The above mentioned example sequence 500 of execution of organization blocks is also illustrated in FIG. 5. As shown in FIG. 5, the first cycle (513 and 523) includes the sequential execution of the organization blocks OB1 and OB2. From the second cycle onwards (533, 543, 553 and 563), the controller 120 then relies on earliest deadline first to determine which organization block is to be executed. Accordingly, in the second cycle OB1 is executed three times (533, 543, and 553) prior to the execution of OB2 (563). As compared to sequential execution, the current method allows for avoidance of the frequent execution of expensive organization blocks, which do not have a requirement to be called every cycle, from a deadline perspective. As seen from the example, while the deadline of OB2 is missed, priority is given to OB1 since OB1 has an earlier deadline of 195 ms and accordingly the time from lapse of deadline is reduced as compared to sequential execution.

In an embodiment, the configuration tool 110 is capable of determining a functional relationship between a first function block and second function block from the plurality of function blocks, such that the execution of the second function block is dependent on the execution of the first function block. In such cases, the configuration tool 110 defines a logical function block, where the logical function block comprises the first function block and the second function block, and where the logical function block is for scheduling the execution of the first and second function block. The sampling time of the logical function block is based on a sampling time of the first function block and a sampling time of the second function block. By creating a logical function block, the configuration tool 110 creates the first and second function blocks as one single function block for the purpose of creating the function block clusters and generating the organization blocks.

The present disclosure can take a form of a computer program product comprising program modules accessible from computer-usable or computer-readable medium storing program code for use by or in connection with one or more computers, processing units, or instruction execution system.

Figure 6:
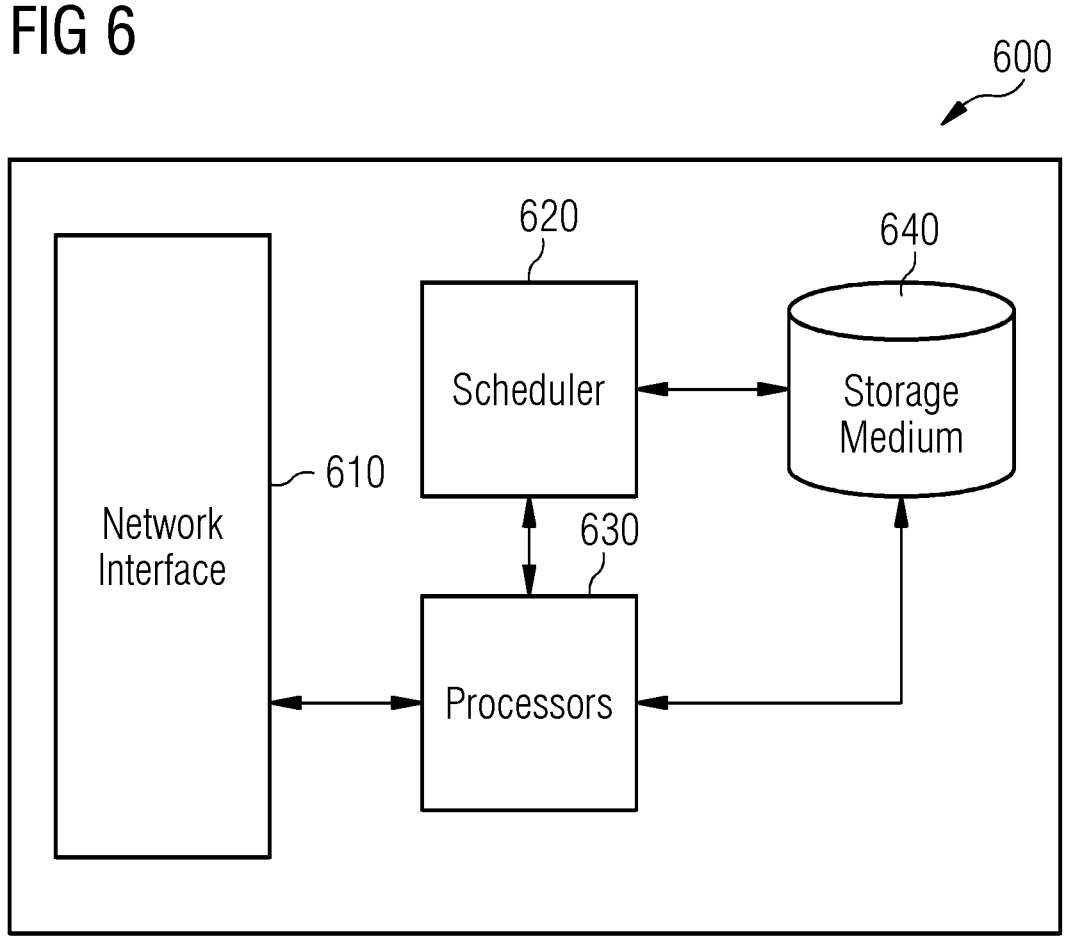
FIG. 6 is a schematic illustration of an exemplary configuration tool for scheduling one or more control applications on a controller in accordance with the invention.

Accordingly, the current disclosure describes a non-transitory storage medium 640 containing instructions for scheduling one or more control applications on a controller. As shown in FIG. 6, in an example, the non-transitory storage medium 640 forms a part of a configuration tool 600. The configuration tool 600 includes network interface 610 connected to the controller 120 and a data repository comprising a plurality of function blocks, and one or more processors connected to the non-transitory storage medium or memory module storing one or more instructions. The one or more processors, upon execution of the one or more instructions, are configured to receive a plurality of function blocks associated with the controller from the data repository via the network interface, define a plurality of function block clusters by clustering a plurality of function blocks of the cyclic control applications based on a sampling time of each function block from the plurality of function blocks, where each cluster comprises one or more function blocks having a sampling time with a first range, create a plurality of organization blocks from the plurality of function block clusters, each organization block comprising one or more function blocks from a function block cluster and an organization block record including a sampling time value and next deadline time value associated with a corresponding organization block, and is configured to deploy the plurality of organization blocks for execution on the controller, where deploying the plurality of organization blocks includes execution of organization blocks based on at least either a sampling time value and/or the next deadline time value. The configuration tool 600 further comprises a scheduler 620 that determines the organization block for execution based on an earliest deadline first scheduling technique as explained previously.

While the current disclosure describes the configuration tool 600 as an independent component, the configuration tool may be a software component and may be realized within the controller 120. Additionally, in an embodiment, one or more parts of the configuration tool 600 (such as the scheduler 620) may be realized within the controller 120.

For the purpose of the present disclosure, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to a few industrial devices, a plurality of industrial devices may be utilized in the context of the disclosed embodiments of the invention. Moreover, while the current disclosure is explained using a single controller device, a plurality of controller devices may be used. While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for scheduling at least one cyclic control application on a controller, each cyclic control application comprising at least one function block, the method comprising:
   a) defining a plurality of function block clusters by clustering a plurality of function blocks of cyclic control applications based on a sampling time of each function block from the plurality of function blocks, each function block cluster of the plurality of function block clusters comprising at least one function block having the sampling time within a corresponding range;
   b) creating a plurality of organization blocks from the plurality of function block clusters, each organization block of the plurality of organization blocks comprising at least one function block from a respective function block cluster and an organization block record including a sampling time value and next deadline time value associated with a corresponding organization block of the plurality of organization blocks; and
   c) scheduling the plurality of organization blocks for execution on the controller, based on at least one of (i) the sampling time value and (ii) the next deadline time value of each organization block from the plurality of organization blocks;
   wherein the sampling time value of an organization block is based on at one sampling time of at least one function block of the corresponding organization block.

2. The method as claimed in claim 1, wherein the next deadline time value of the organization block is determined based on at least one deadline value of the at least one function block of the corresponding organization block.

3. The method as claimed in claim 1, wherein the organization block record further comprises at least one invocation time value, and an estimated execution time value associated with the corresponding organization block.

4. The method as claimed in claim 3, the method further comprising:
   updating the invocation time value and the next deadline value time of an organization block from the plurality of organization blocks after the execution of the corresponding organization block.

5. The method as claimed in claim 1, wherein said scheduling the plurality of organization blocks comprises:
   a) determining a first organization block within which a next deadline time value of a first organization block is prior to a next deadline time value of each other organization block; and
   b) scheduling the first organization block for execution on the controller, execution of the first organization block occurring prior to execution of every other organization block from the plurality of organization blocks.

6. The method as claimed in claim 1, wherein said defining a plurality of function block clusters comprises applying a K-means clustering technique on the plurality of function blocks.

7. The method as claimed in claim 1, the method further comprising:
   a) determining a functional relationship between a first function block and second function block from the plurality of function blocks, execution of the second function block being dependent on execution of the first function block; and
   b) defining a logical function block which comprises the first function block and the second function block, the logical function block being for scheduling the execution of the first and second function blocks;
   wherein a sampling time of the defined logical function block is based on a sampling time of the first function block and a sampling time of the second function block.

8. A configuration tool for scheduling at least one cyclic control application on a controller, each cyclic control application comprising at least one function blocks, the configuration tool comprising:
   a) a network interface connected to the controller and a data repository comprising a plurality of function blocks;
   b. at least one processor connected to a memory module and storing at least one instruction, the at least one processor, upon execution of the at least one instruction, being configured to:
      i. receive a plurality of function blocks associated with the controller from the data repository via the network interface;
      ii. define a plurality of function block clusters by clustering the plurality of function blocks of cyclic control applications based on a sampling time of each function block from the plurality of function blocks, each function block cluster of the plurality of function block clusters comprising at least one function block having the sampling time within a corresponding range;
      iii. create a plurality of organization blocks from the plurality of function block clusters, each organization block of the plurality of organization blocks comprising at least one function block from a respective function block cluster and an organization block record including a sampling time value and next deadline time value associated with a corresponding organization block of the plurality of organization blocks; and
      iv. deploy the plurality of organization blocks for execution on the controller, said deploying the plurality of organization blocks including execution of organization blocks based on at least one of (i) the sampling time value and (ii) the next deadline time value;
      wherein the sampling time value of an organization block is based on at least one sampling time of at least one function block of the corresponding organization block.

9. The configuration tool as claimed in claim 8, wherein the at least one processors is further configured to apply a K-means clustering technique on the plurality of function blocks to define the function block clusters.

10. The configuration tool as claimed in claim 8, wherein the at least one processor is further configured to:
    a) determine a functional relationship between a first function block and second function block from the plurality of function blocks, said execution of the second function block being dependent on the execution of the first function block; and
    b. define a logical function block which comprises the first function block and the second function block, the logical function block being for scheduling the execution of the first and second function blocks;
    wherein a sampling time of the logical function block is determined based on a sampling time of the first function block and a sampling time of the second function block.

11. A non-transitory computer-readable storage medium having machine-readable instructions stored therein, which when executed by a processing unit, cause the processing unit to:
  a) define a plurality of function block clusters by clustering a plurality of function blocks of cyclic control applications based on a sampling time of each function block from the plurality of function blocks, each function block cluster of the plurality of function block clusters comprising at least one function block having the sampling time within a corresponding range;
  b) create a plurality of organization blocks from the plurality of function block clusters, each organization block of the plurality of organization blocks comprising at least one function block from a respective function block cluster and an organization block record including a sampling time value and next deadline time value associated with the corresponding organization block; and
  c. scheduling the plurality of organization blocks for execution on the controller, based on at least one of (i) the sampling time value and (ii) the next deadline time value of each organization block from the plurality of organization blocks;
    wherein the sampling time value of an organization block is based on at least one sampling time of at least one function block of the corresponding organization block.

\* \* \* \* \*